Patented Dec. 19, 1950

2,534,914

UNITED STATES PATENT OFFICE 2,534,914

TRIAZOLE COMPOUNDS

John David Kendall and Harold Gordon Suggate, Ilford, England, assignors to Ilford Limited, Ilford, England, a British company No Drawing. Application August 3, 1949, Serial No. 108,417. In Great Britain August 6, 1948

4 Claims. (Cl. 260—240)

This invention relates to the production of formamidines.

According to the present invention formamidines are prepared by condensing an amino triazole of the general formula:

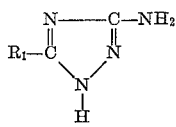

where $R_1$ is a hydrogen atom or an alkyl group, with an ester of ortho formic acid.

The compounds obtained by the foregoing process conform to the general formula:

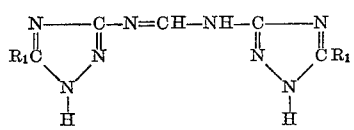

or a tautomer thereof. They are valuable stabilisers for photographic emulsions as described in our co-pending application Serial No. 108,418.

$R_1$ in the foregoing general formulae may be a hydrogen atom or an alkyl group, e. g. methyl, ethyl or higher alkyl groups. Any ester of ortho formic acid may be used, but it is preferred to employ alkyl esters, e. g. methyl, ethyl or higher alkyl esters. Since the ester group does not appear in the final product, its nature is of no importance.

The initial amino triazoles can be prepared by the action of the appropriate acid, e. g. acetic or propionic acid on amino guanidine bicarbonate, the method being analogous to that described in Organic Syntheses, volume 26, page 11.

The condensation can be very readily effected by heating the amino triazole and the ortho ester together. The quantity of ester employed should be sufficient to react with all the amino triazole present, i. e. at least one mol of the ester for two mols of the amino triazole, but in practice it is usually convenient to use a considerable excess of the ester, which serves also to keep the reaction mixture in the form of a solution. Where the quantity of ester employed is little or no excess over that required for the reaction, an inert solvent may be present, e. g. pyridine.

The following examples will serve to illustrate the invention:

Example 1

Two molecular equivalents of 3-amino-1.2.4-triazole were mixed with an excess over one molecular equivalent of ethyl orthoformate and the mixture boiled for two hours. It was then cooled and the solid product which separated was filtered off and boiled out with ethyl alcohol to purify it. It was 3.3'-bis(1.2.4-triazolyl)-formamidine and was obtained as white rhombs. M. pt. above 285° C.

Example 2

The procedure of Example 1 was followed using 3-amino-5-methyl-1.2.4-triazole. The product obtained was 3.3'-bis(5-methyl-1.2.4-triazolyl)-formamidine, white rhombs, m. pt. 275° C.

Example 3

The procedure of Example 1 was followed using 3-amino-5-ethyl-1.2.4-triazole. The product obtained was 3.3'-bis(5-ethyl-1.2.4-triazolyl)-formamidine, white rhombs, m. pt. 263° C.

Although in the foregoing examples the reagents were boiled for two hours, this is not absolutely necessary. Boiling for only a few minutes, or heating for a longer period at temperatures below boiling point afford good yields of the desired products.

What we claim is:

1. Triazolyl formamidines of the general formula:

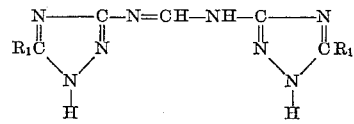

where $R_1$ is selected from the class consisting of the hydrogen atom and alkyl groups.

2. The compound 3.3'-bis(1.2.4-triazolyl)-formamidine.

3. The compound 3.3'-bis(5-methyl-1.2.4-triazolyl)-formamidine.

4. The compound 3.3'-bis(5-ethyl-1.2.4-triazolyl)-formamidine.

JOHN DAVID KENDALL.
HAROLD GORDON SUGGATE.

REFERENCES CITED

The following references are of record in the file of this patent:

UNITED STATES PATENTS

| Number | Name | Date |
| --- | --- | --- |
| 2,080,049 | Kendall | May 11, 1937 |
| 2,394,067 | Kendall | Feb. 5, 1946 |
| 2,444,608 | Heimback | July 6, 1948 |
| 2,475,136 | Heimback | July 5, 1949 |
| 2,476,525 | Anish | July 19, 1949 |